(12) United States Patent
Brooker et al.

(10) Patent No.: US 9,971,531 B2
(45) Date of Patent: *May 15, 2018

(54) DYNAMIC CONFIGURATION OF DATA VOLUMES

(71) Applicant: Amazon Technologies, Inc., Seattle, WA (US)

(72) Inventors: Marc John Brooker, Seattle, WA (US); James Michael Thompson, Seattle, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/601,985

(22) Filed: May 22, 2017

(65) Prior Publication Data

US 2017/0255409 A1 Sep. 7, 2017

Related U.S. Application Data

(63) Continuation of application No. 14/668,782, filed on Mar. 25, 2015, now Pat. No. 9,658,785.

(51) Int. Cl.
*G06F 12/02* (2006.01)
*G06F 3/06* (2006.01)

(52) U.S. Cl.
CPC .......... *G06F 3/0619* (2013.01); *G06F 3/0604* (2013.01); *G06F 3/067* (2013.01); *G06F 3/0631* (2013.01); *G06F 3/0647* (2013.01); *G06F 3/0653* (2013.01); *G06F 3/0665* (2013.01); *G06F 3/0689* (2013.01)

(58) Field of Classification Search
CPC .... G06F 3/0604; G06F 3/0619; G06F 3/0631; G06F 3/0647; G06F 3/0653; G06F 3/0665; G06F 3/067; G06F 3/0689
See application file for complete search history.

(56) References Cited

U.S. PATENT DOCUMENTS 6,895,485 B1   5/2005 DeKoning et al.
7,343,410 B2   3/2008 Mercier et al.
(Continued)

OTHER PUBLICATIONS

U.S. Appl. No. 13/465,998, filed May 7, 2012, Marc J. Brooker, et al.
(Continued)

*Primary Examiner* — Yong Choe
(74) *Attorney, Agent, or Firm* — Robert C. Kowert; Meyertons, Hood, Kivlin, Kowert & Goetzel, P.C.

(57) ABSTRACT

A storage system may implement dynamic configuration of data volumes. Client utilization of a data volume in a storage system may be tracked or monitored. Based on the utilization of the data volume, configuration recommendations to reconfigure the data volume according to data volume offerings may be determined. The data volume may be configured according to an authorized configuration recommendation. In some embodiments, these recommendations may be provided to a client and selection of the configuration recommendation to perform may be received. In some embodiments, a configuration recommendation may be automatically performed based on previously provided authorization to configure the data volume.

20 Claims, 9 Drawing Sheets

(56) References Cited

U.S. PATENT DOCUMENTS

| | | |
|---|---|---|
| 7,428,658 B2 | 9/2008 | Nagin et al. |
| 8,166,128 B1 | 4/2012 | Faulkner et al. |
| 8,244,868 B2 | 8/2012 | La Frese et al. |
| 8,296,514 B2 | 10/2012 | Van Hise et al. |
| 8,577,836 B2 | 11/2013 | Kopylovitz et al. |
| 9,658,785 B2 | 5/2017 | Brooker et al. |
| 2005/0289308 A1* | 12/2005 | Kano ............... G06F 3/0605 711/161 |
| 2012/0198151 A1 | 8/2012 | Kato et al. |

OTHER PUBLICATIONS

U.S. Appl. No. 13/424,290, filed Mar. 19, 2012, Marc J. Brooker, et al.
U.S. Appl. No. 13/466,007, filed May 7, 2012, Marc J. Brooker, et al.
U.S. Appl. No. 13/466,010, filed May 7, 2012, Marc J. Brooker, et al.
U.S. Appl. No. 13/466,014, filed May 7, 2012, Marc J. Brooker, et al.
U.S. Appl. No. 13/466,022, filed May 7, 2012, Marc J. Brooker, et al.
U.S. Appl. No. 14/642,445, filed Mar. 9, 2015, Marc J. Brooker, et al.
International Search Report and Written Opinion from PCT/US2016/024328, dated Jun. 10, 2016, Amazon Technologies, Inc., pp. 1-11.

\* cited by examiner

DYNAMIC CONFIGURATION OF DATA VOLUMES

This application is a continuation of U.S. patent application Ser. No. 14/668,782, filed Mar. 25, 2015, now U.S. Pat. No. 9,658,785, which is hereby incorporated by reference herein in its entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. Block-based storage may be configured in many ways, some of which may be more optimal for a particular use case than others. However, as there are many ways in which block-based storage may be configured, it may be difficult to discover the optimal configuration when initially setting up storage.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement dynamic configuration of data volumes. Data volumes may provide block-based storage for a variety of clients, in various embodiments. These clients may utilize the data volume as part of performing many different applications, such as database systems, virtual desktops, development and test environments, business applications, or data archives. In order to provide better performance and/or cost benefits, data volumes may be configured differently. For instance, some data volumes may receive large I/O workloads, whereas other data volumes may be infrequently accessed. Determining the appropriate data volume configuration can be difficult as the predicted utilization of a data volume may not equal the actual utilization of a data volume. Thus, initial configurations of data volumes selected may not prove as optimal for certain tasks once utilization of the data volume commences. Dynamic configuration of data volumes may provide a way to discover optimal data volume configurations based on actual utilization of the data volume. Changes to a data volume configuration may be performed automatically, or with explicit authorization.

Figure 1:
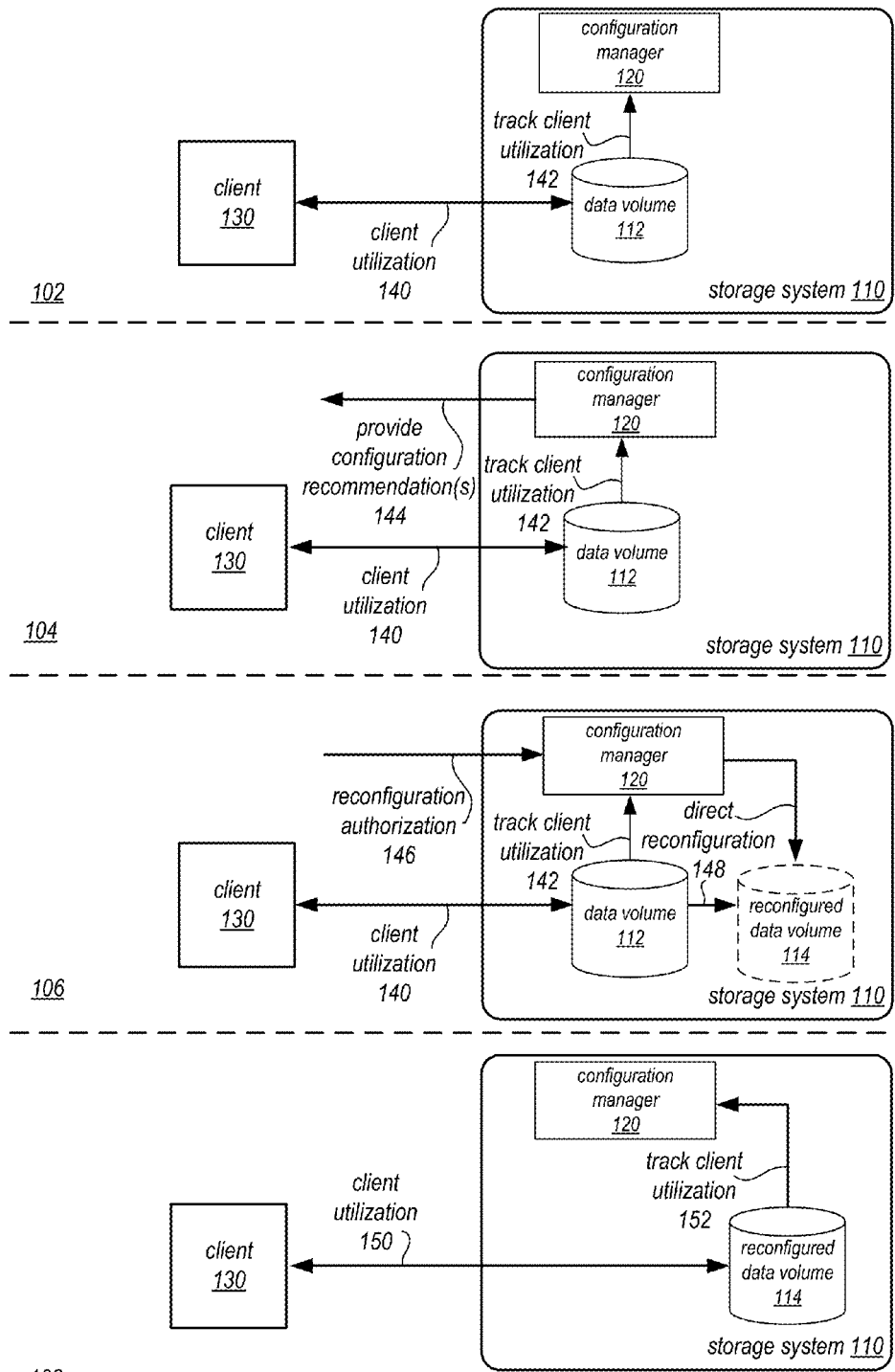
FIG. 1 illustrates a series of logical block diagrams that illustrate dynamic configuration of data volumes, according to some embodiments.

FIG. 1 illustrates a series of logical block diagrams that illustrate dynamic configuration of data volumes, according to some embodiments. As illustrated in scene 102, client 130 utilizes 140 data volume 112 to provide block-based storage for various client applications, tasks, and/or functions. For instance, client 130 may be a database engine which stores data for a database in data volume 112, performing various read and write requests to get and update data for the database. Storage system 110 may host data volume 112 for client 130 in a particular configuration. For instance, data volume 112 may be implemented by solid state drives (SSDs) or magnetic storage drives (e.g., HDDs) to store data in the data volume. Data volumes may be implemented as one of many different types. Moreover, different allocations of resources for the different volume types may be employed (e.g., amount of storage space or number of IOPS allocated to provide access to the data volume). Data volume configurations may be implemented according to a data volume offering provided by storage system 110. For instance, a certain type of data volume may have different resource allocations (e.g., allocating IOPS in increments of 100 IOPS, or allowing a user defined resource allocation within a particular range).

Figure 6:
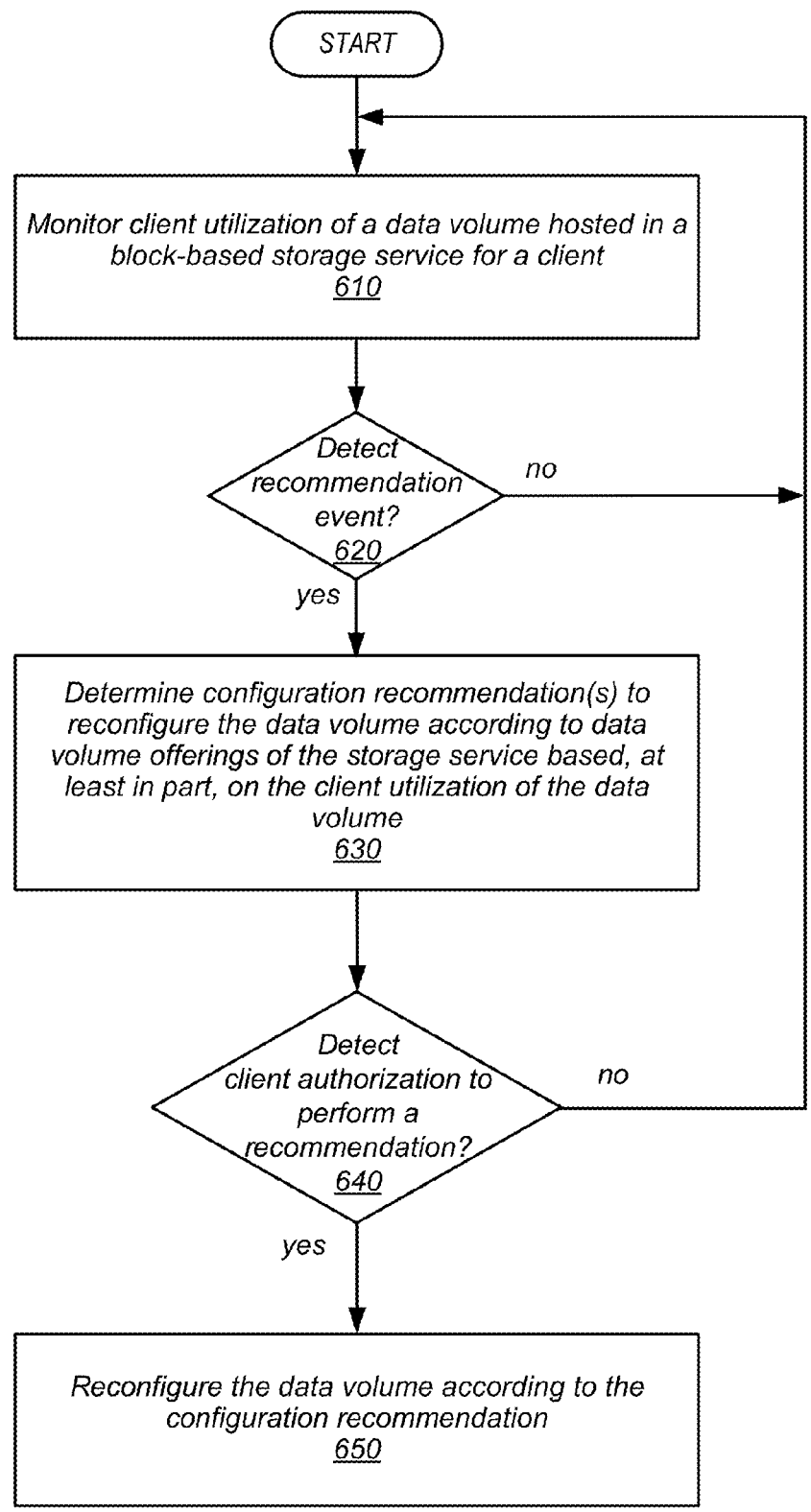
FIG. 6 is a high-level flowchart illustrating various methods and techniques for implementing dynamic configuration of data volumes, according to some embodiments.
Figure 7:
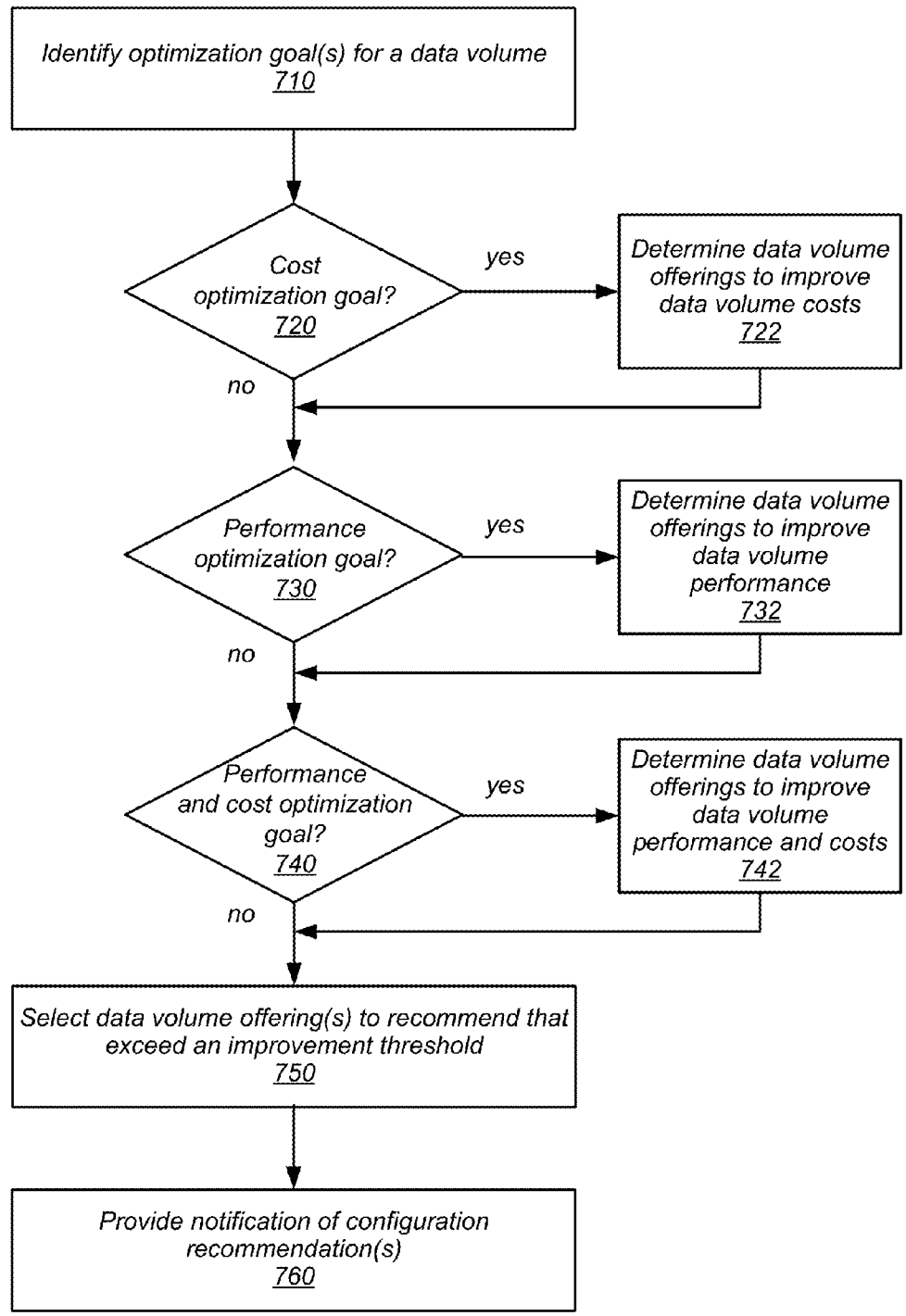
FIG. 7 is a high-level flowchart illustrating various methods and techniques for determining configuration recommendations, according to some embodiments.

Storage system 110 may implement configuration manager 120 to track client utilization 142 of data volume 112. As illustrated in scene 104, configuration manager 120 may provide configuration recommendation(s) 144 to reconfigure data volume 112. Such recommended configurations may improve the performance and/or cost of the data volume, changing the type and/or resource allocation of the data volume, in various embodiments, according to data volume offerings of storage system 110. For instance, if data volume 112 is stored in HDDs, a configuration recommendation may indicate that a change to a volume type that is backed by SSDs may increase workload capacity of the data volume. The recommendation may indicate a data volume offering that includes the volume type backed by SSDs. FIGS. 6 and 7 below provide various examples of determining configuration recommendation(s).

As illustrated in scene 106, reconfiguration authorization 146 may be provided to authorize one of the recommended configuration recommendations. For instance, a selection may be provided via graphical user interface or application programming interface (API) request that indicates the configuration recommendation to perform. Configuration manager 148 may direct reconfiguration 148 to implement reconfigured data volume 114. Migration operations may be performed to move the data volume to other hosts, in some embodiments, that may be capable of hosting the reconfigured data volume. As illustrated in scene 106, client 130 may continue to have access to data volume 112 during the reconfiguration. Once complete, client 130 may access reconfigured data volume 114, utilizing the data volume 150 according to the new configuration.

Please note that previous descriptions are not intended to be limiting, but are merely provided as an example of dynamic configuration of data volumes. Various components may perform configuration management. Different numbers or types of data volumes, and clients may be employed.

This specification begins with a general description of a provider network, which may implement dynamic configuration of data volumes offered via a block-based storage service. Then various examples of a block-based storage service are discussed, including different components/modules, or arrangements of components/module that may be employed as part of configuring data volumes in the block-based storage service. A number of different methods and techniques to implement dynamic configuration of data volumes are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
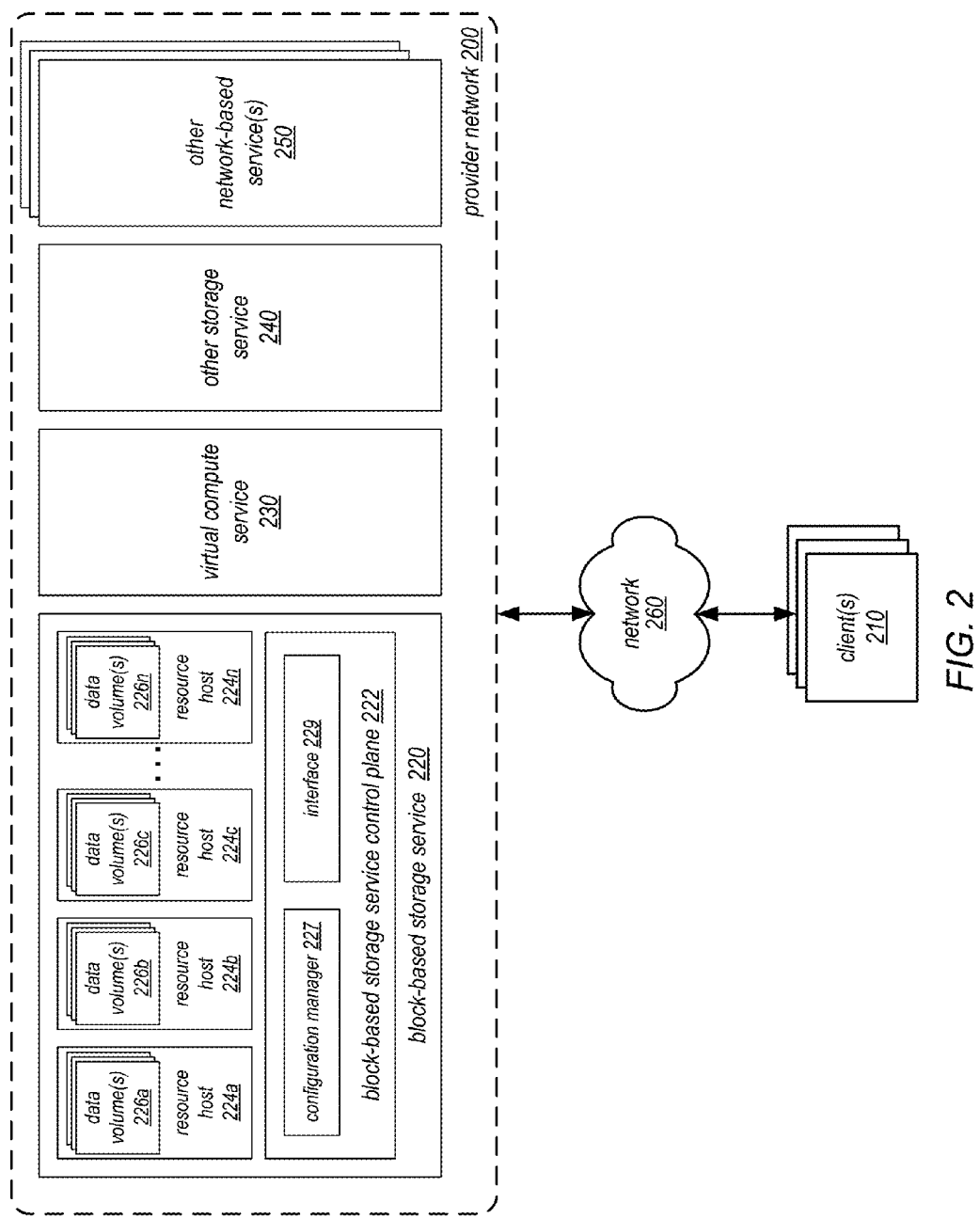
FIG. 2 is a block diagram illustrating a provider network that includes a block-based storage service that implements dynamic configuration of data volumes, according to some embodiments.

FIG. 2 is a block diagram illustrating a provider network that includes a block-based storage service that implements dynamic configuration of data volumes, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems or storage nodes), which provide block level storage for storing one or more sets of data volumes, data volume(s) 226a, 226b, 226c, through 226n. Data volumes 226 may be mapped or attached over a network to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Figure 9:
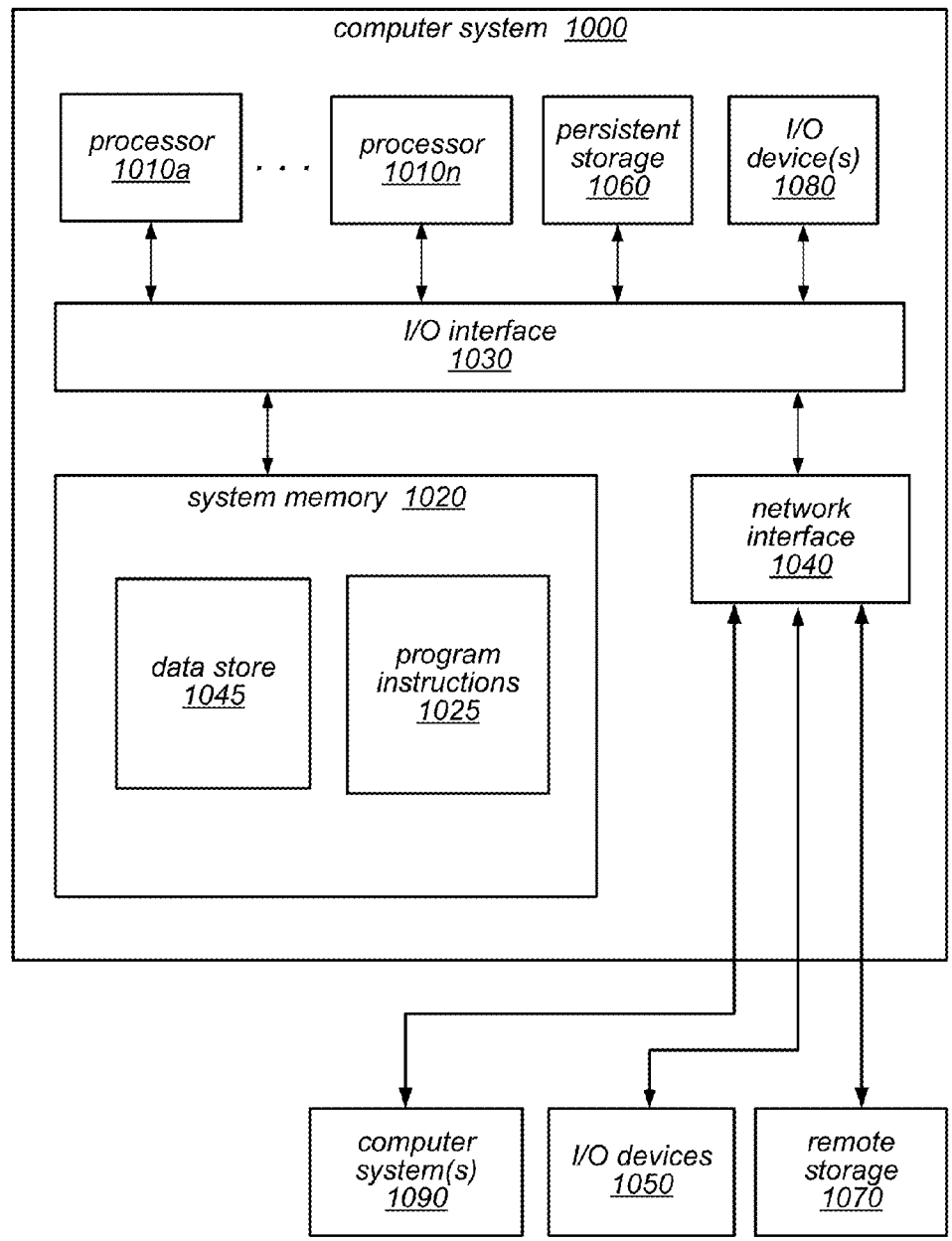
FIG. 9 is a block diagram illustrating an example computing system, according to some embodiments.

Resource hosts 224 may be one or more computing systems or devices, such as a storage server or other computing system (e.g., computing system 1000 described below with regard to FIG. 9). Each resource host 224 may maintain respective replicas of data volumes. Some data volumes may differ in configuration from other data volumes, in some embodiments. Therefore some resource hosts 224 may host multiple data volumes which may have different configurations. Some configurations of data volumes may be implemented at resource hosts with a particular type of hardware (e.g., solid state storage drives (SSDs) or magnetic disk storage (e.g., hard disk drives (HDDs)) or software (e.g., different storage manager operations/applications) in order to provide for different types, specifications, and other performance characteristics of a data volume. For example, some resource hosts may implement SSDs for persistent block storage in order to provide higher throughput capabilities (e.g., Input/Output Operations per Second (IOPS), while other resource hosts may implement HDDs or other magnetic-based persistent storage devices which may have greater storage capacity (if less throughput capability).

Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

As noted above, block-based storage service 220 may provide a variety of different configurations of data volumes, such as different types of data volumes or different resource allocations to provide different performance characteristics. Different data volume offerings provided by block-based storage service 220 may combine the various types and/or resource allocations of data volumes for utilization by a client. For instance, in at least some embodiments, block-based storage service 220 may provide data volume offerings that include different types of data volumes, such as (but are not limited to) general purpose data volumes, provisioned access data volumes, and/or cost-efficient data volumes. Data volume offerings may provide clients with the ability to select (with varying granularity) the performance and/or cost of data volumes.

In at least some embodiments, general purpose data volumes may be backed by SSDs and may provide performance sufficient for many different types of workloads, such as small to medium-sized databases, development and test environments, and boot data volumes. A boot data volume may, in some embodiments, allow a virtual compute instance, such as an instance provided by virtual compute service 230, to boot directly from the boot data volume. Virtual instances booted from a boot data volume can be stopped and later restarted, preserving any of the state that is saved to the boot data volume and allowing the modification of some properties of virtual compute instances while the instances are stopped. Resource allocation for general purpose data volumes may be configured in many ways. For instance, general purpose data volumes may be configured in a range of different storage sizes (e.g., 1 Gigabyte to 1 Terabyte).

Resource allocation to provide access to stored data may vary as well. For instance, in some embodiments, different data volume offerings of general purpose data volumes may provide a baseline access performance (e.g., 3 IOPS per Gigabyte with a total throughput of up to 128 Megabytes per second for a data volume). Additional access performance capacity may be provided as available or based on different sharing or scheduling schemes. For instance, general purpose data volumes may provide additional access capacity for burst performance (e.g., the ability to burst up to 3,000 IOPS per volume). This burst performance capacity may, in some embodiments be independent of volume size (e.g., allowing burst performance of 3,000 IOPS for a 20 GB data volume or a 900 GB data volume). Burst-performance capacity may be allocated, in some embodiments, by implementing a credit balance scheme for determining how much additional access capacity may be provided for a data volume. For instance, the storage size of a data volume may be tied to credit refill rate for a credit balance of a data volume. A credit may guarantee the additional access capacity for a period of time (e.g., guarantee the 3,000 IOPS for 1 second). For each period of time the additional capacity is used, a credit may be deducted from the credit balance for the data volume. New credits may be added to the credit balance according to the credit refill balance. If all credits for a data volume are used, then access to the data volume may be throttled to a baseline performance level, in some embodiments.

Block-based storage service 200 may provide a provisioned access data volume type, in some embodiments. Provisioned access data volumes may offer storage with consistent and low-latency performance, which may be beneficial for client utilization with I/O-intensive workloads (e.g., databases). In at least some embodiments, provisioned access data volumes may be backed by SSDs. For instance, provisioned access data volumes support up to a particular number of IOPS for a data volume (e.g., 30 IOPS per GB, which would allow 4,000 IOPS to be provisioned for a provisioned access data volume as small as 134 GB). Provisioned access data volumes may allow different throughput levels for a data volume to be achieved (e.g., provisioning 500 IOPS for a data volume may allow up to 128 MB/S throughput). In some embodiments, multiple volumes can be logically combined (e.g., striped together in RAID format), which may provide increased access and throughput performance. In some embodiments, virtual compute instance types configured to optimize provisioned access may be utilized in conjunction with provisioned access data volumes in order to provide low latency and consistent performance.

Block-based storage service 200 may provide a cost-efficient data volume type, in some embodiments. Cost-efficient data volume types may provide a lower cost for storage of data than other data volume types. For example, in some embodiments cost-efficient data volumes may be backed by magnetic storage drives (e.g., HDDs). Cost-efficient data volumes may provide efficient storage for data volume utilization where data is accessed infrequently, and/or scenarios where the lowest storage cost is important. Cost-efficient data volumes may provide various access capabilities (e.g., 100 IOPS baseline performance, with an ability to burst to hundreds of IOPS).

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to placement requests. In at least some embodiments, block-based storage service control plane 222 may implement configuration manager 227, such as described in further detail below with regard to FIG. 3, and interface 229, such as described below with regard to FIG. 4. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In at least some embodiments, configuration recommendations may indicate that a data volume be moved to or stored in another storage service (e.g., as a snapshot or archived copy). In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
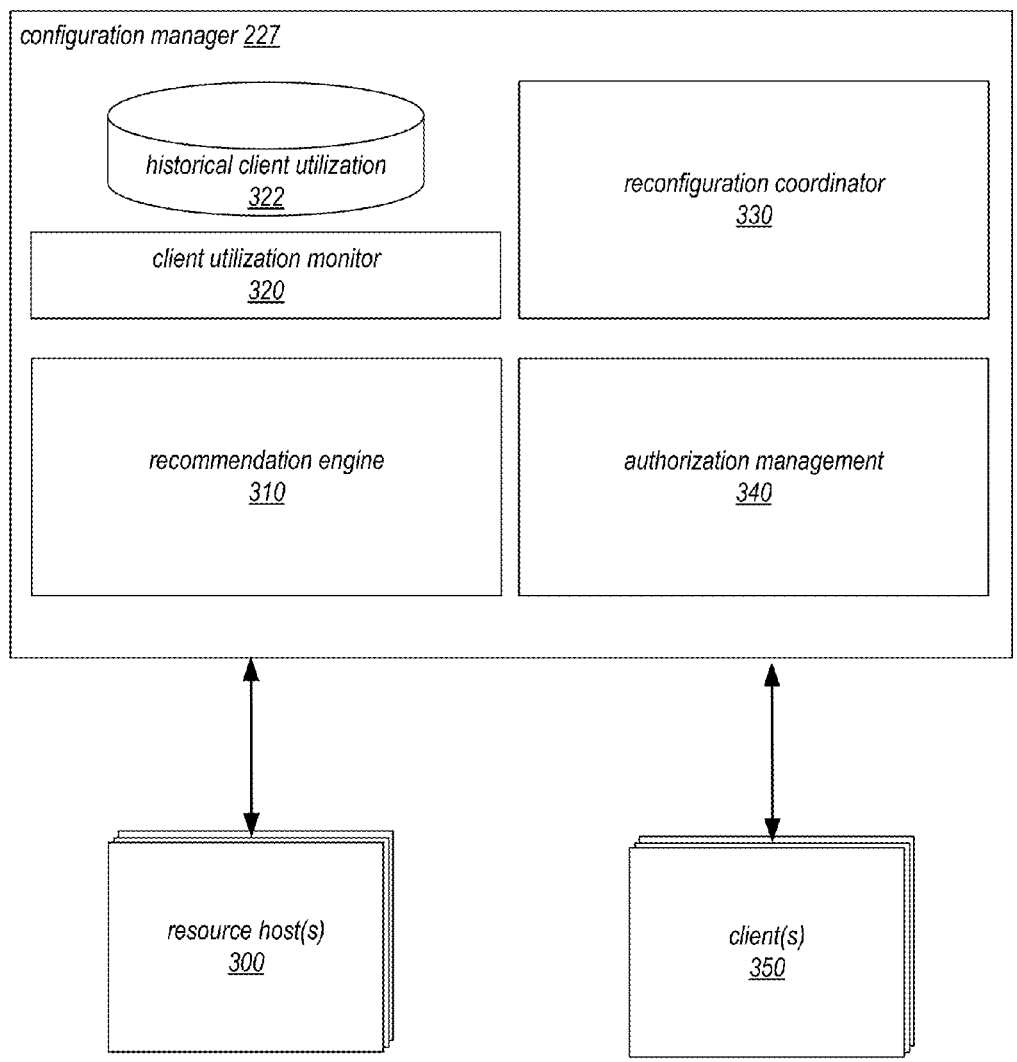
FIG. 3 is a logical block diagram illustrating a configuration manager that implements dynamic configuration of data volumes, according to some embodiments.

FIG. 3 is a logical block diagram illustrating a configuration manager that implements dynamic configuration of data volumes, according to some embodiments. Configuration manager 227 may provide implement various techniques, such as those discussed below with regard to FIGS. 4-8, to provide dynamic configuration of data volumes. Configuration manager 227 may detect recommendation events for determining and/or performing configuration recommendations. In some embodiments, reconfiguration may provide notifications of configuration recommendations to client(s) 350 and/or receive selections or authorizations to perform configuration recommendations. In some embodiments, configuration recommendations may be performed automatically (e.g., based on previously received authorization from a client and/or previously selected optimization goals.

As noted above, multiple resource hosts, such as resource host(s) 300, may be implemented in order to provide block-based storage services. In at various embodiments, configuration manager 227 may implement client utilization monitor 320 to collect, track, and or monitor historical client utilization data. For instance, client utilization monitor 320 may periodically sweep resource host(s) 300 with a query for information, metrics, or metadata which indicate client utilization of the data volumes hosted on the resource host(s). For example, client utilization data may, in various embodiments, indicate the various aspects in which a data volume has been used on behalf of a client. Storage utilization, for instance, may indicate the total amount data stored in a data volume (e.g., 10 Gigabyte) out of total storage allocated to the data volume (e.g., 200 Gigabyte). Access utilization (or some other indication of the workload performed to access a data volume) may be collected (e.g., number of IOPS utilized). Other performance characteristics, such as throughput (e.g., number of bytes transferred per second) or latency (e.g., the amount of time to perform an operation or transaction at the data volume) which may be indicative of or related to client utilization may be collected. Client utilization monitor 320 may store the data at historical client utilization store 322, which may persistently maintain the collected data. In some embodiments historical client utilization store 322 may be implemented as a database or otherwise searchable/query-able storage system to provide access to other components of configuration manager 227 (e.g., by recommendation engine 310 in order to determine configuration recommendations) or block-based storage service control plane 226.

In at least some embodiments, client utilization monitor 320 may detect or trigger recommendation events (or events to perform a configuration recommendation). For instance, if current storage utilization is nearing total capacity, client utilization monitor 320 may trigger a recommendation event, which recommendation engine 310 may detect and determine configuration recommendation(s) for (e.g., to configure the data volume with increased storage size). In various embodiments, triggers for determining data volumes may be configured and/or determined by client(s) 350 via authorization management 340.

Configuration manager 227 may implement recommendation engine 310, in various embodiments, to detect recommendation events and/or determine configuration recommendations for data volumes at resource host(s) 300. Recommendation engine 310 may implement various recommendation techniques to identify different configuration recommendations for data volumes to reconfigure the data volume such that subsequent access to a data volume after reconfiguration is provided at the new configuration. For instance, baseline or likely utilization or requirements for a data volume may be determined based on an analysis of the historical client utilization data. If, for example, workload of a data volume varies between 100 and 500 IOPS, then a baseline requirement of 500 IOPs may be identified. In at least some embodiments, the baseline or likely utilization may be examined with respect to a current configuration of a data volume. Consider the example above, where up to 500 IOPs may be utilized at times for the data volume. The current configuration may be implemented at a cost-efficient data volume type that provides only a guaranteed 100 IOPs performance for workloads at the data volume. The workload for the data volume exceeds guarantees provided for the type of data volume, and therefore it may be that a different configuration of the data volume may provide a better guarantee of service (e.g., a general purpose data volume type with a higher amount of baseline IOPS performance). A data volume offering that provides capability to meet the workload of the data volume may be identified for recommendation.

Configuration recommendations may be determined which may optimize or improve a data volume with respect to performance and/or cost. Whether it is identified performance deficiencies (as described in the example above) or cost deficiencies (e.g., not utilizing all of data volume such that costs are wasted), configuration goals may be identified for a data volume. In some embodiments, configuration goals may be explicitly defined by a client (e.g., only provide configuration recommendations that increase performance AND lower cost). In other embodiments, configuration goals may be dynamically identified based on the performance and/or cost deficiencies described above and/or other triggers, alarms or scenarios in which volume configurations may need to be changed (e.g., detecting that a data volume is running out of available storage). Different optimization techniques may be implemented to solve for the identified configuration goals based on possible configurations of a data volume (e.g., implementing various terminating, iterative, or heuristic-based techniques) to solve for configurations that improve a data volume with respect to one or more of the identified goals. Configuration recommendations may include changes to data volume type (e.g., general purpose, provisioned access, or cost-efficient) and/or resource allocation or utilization of a data volume (e.g., storage volume. In some embodiments, configuration recommendations may be generated based upon a determination that a different locality (e.g., different resource host or infrastructure zone) may provide better performance for a data volume (e.g., configuring a data volume at a locality with lower network utilization in order to provide better network access to the data volume). Appropriate data volume offerings that provide the recommended configurations may be identified, in some embodiments. Multiple configuration recommendations may be generated for a data volume.

Configuration manager 227 may provide notifications of configuration recommendations to client(s) 350, in various embodiments, as discussed below. For example, authorization management 340 may be implemented to generate and send notifications (e.g., electronic mail messages, post messages to client monitored message boards, or other communication techniques) that include configuration recommendations. Authorization management 340 may provide an interface to receive back selections of configuration recommendations authorized to perform and/or set up authorization for automated reconfiguration of data volumes as discussed below with regard to FIG. 4, in some embodiments.

Configuration manager 227 may implement reconfiguration coordinator 330 to perform authorized configurations. For instance, in at least some embodiments, migration operations may be performed to move a data volume to a different resource host with capability and/or capacity to host the data volume in the new recommended configuration. A migration operation may, in some embodiments, be performed by directing a current resource host to transfer the data volume to the destination resource host. In some embodiments, an intermediary, such as a migration worker task or node, may direct and/or receive the resource before sending the resource to the destination resource host. Multiple migration operations may be performed to move a data volume that has multiple replicas or copies (e.g., master and slave(s)) in some embodiments. Migration operations may be performed in such a way as not to disrupt or impact client utilization of the data volume. For instance, the migration operation may always be performed so that one or more replicas of a data volume is available to service access requests to the data volume (e.g., 2 replicas add a 3rd replica in the new configuration, copy the data volume to the 3rd replica, drop 1 of the first 2 replicas, and repeat to add a second new replica in the new configuration, finally dropping the second replica of the old configuration in order to have 2 replicas in the new configuration). In at least some embodiments, configuring a data volume may include updating a resource host to provide the data volume at a new configuration, without migrating the data volume (e.g., allocate additional storage to the data volume, allocate additional IOPs to the data volume, etc.). Updates to different metadata, account information, billing, metering, or other data for a client (e.g., user account data) may be performed to reflect changes made by reconfiguring the data volume (e.g., updating a billing rate or other metering information to reflect the new volume configuration).

Figure 4:
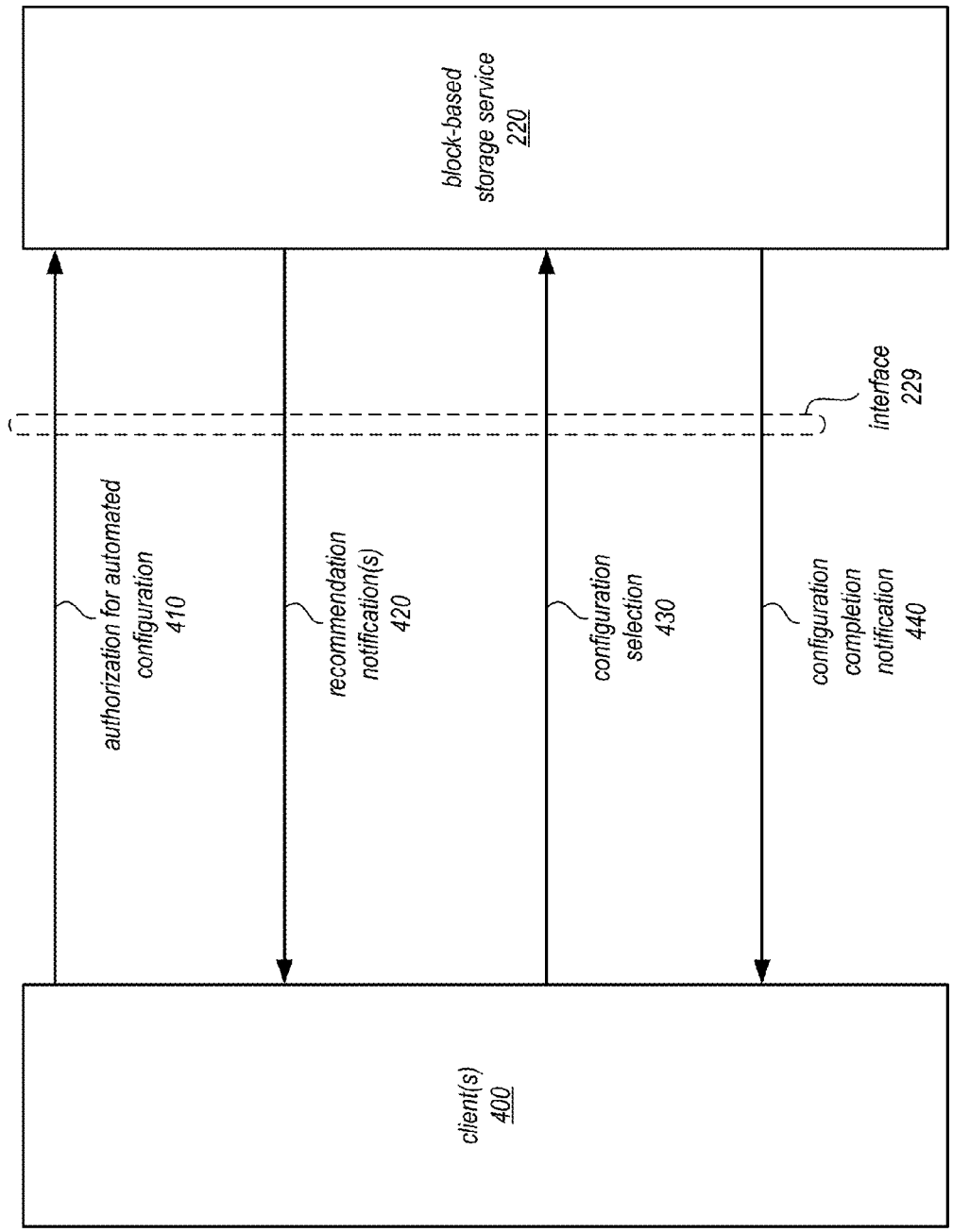
FIG. 4 is a logical block diagram illustrating interactions between a client and storage service to configure dynamic configuration of data volumes, according to some embodiments.

FIG. 4 is a logical block diagram illustrating interactions between a client and storage service to configure dynamic configuration of data volumes, according to some embodiments. Interface 229 as discussed above with regard to FIG. 2 may be implemented for block-based storage service 220 to provide client(s) 400, such as clients external to provider network 200 (e.g., clients 210) or clients internal to provider network 200 (e.g., other services 230, 240 and so on), with access to various services and functionalities provided by block-based storage service 220. Interface 229 may be implemented as a programmatic interface (e.g., Application Programming Interface (API)) and/or as a graphical user interface (GUI), such as may be implemented at a network-based site (e.g., website). The various requests, responses, notifications, and other communications described below may be provided via interface 229, in some embodiments. For instance, specific API requests may be formatted for requests 410 and 430 and responses 420 and 440.

One or more request(s) authorizing automated configuration 410 may be sent via interface 229. For instance, a pop-up window, series of interfaces (e.g., a wizard), or other graphical user interface may provide one or more options or selections to configure automated configuration of a data volume. For instance, an interface element to identify a particular data volume may be implemented (e.g., a drop menu of data volumes associated with a particular user account) or a search interface in which a data volume name or other identifier may be entered. Selections or input 410 may be provided to identify the data volume. Authorization or consent to perform automated reconfiguration may be communicated via the same and/or different user interface elements (e.g., an "I AGREE" button). In at least some embodiments, the automated configuration may be further configured to perform in certain circumstances. For instance, a trigger event or alarm may be set in response to which reconfiguration may be performed (as discussed below with regard to FIG. 6). Different metrics, information, or other scenarios to trigger the recommendation or configuration event may be specified as part of authorization for automated configuration request 410, in some embodiments.

Recommendation notification(s) 420 may be provided via interface 229 (or some other communication technique) to client(s) 400. For instance, recommendation notification(s) 420 may be provided via an API formatted response sent directly to a client. In some embodiments, alternative communication protocols or technologies may be utilized to provide recommendation notifications, such as electronic mail (e-mail), audible messages (e.g., to a mobile phone), or SMS or MMS text messages. In at least some embodiments, a graphical user interface notification may be provided, such as discussed below with regard to FIG. 5. For instance, an e-mail may be sent to an e-mail address registered to a user account or authorized recipient for recommendation notifications which may provide a link to a network-based site implementing a graphical user interface that includes a recommendation notification. A notification may be posted or displayed at a site dashboard, message-board, or other communication interface provided via a graphical user interface.

Figure 5:
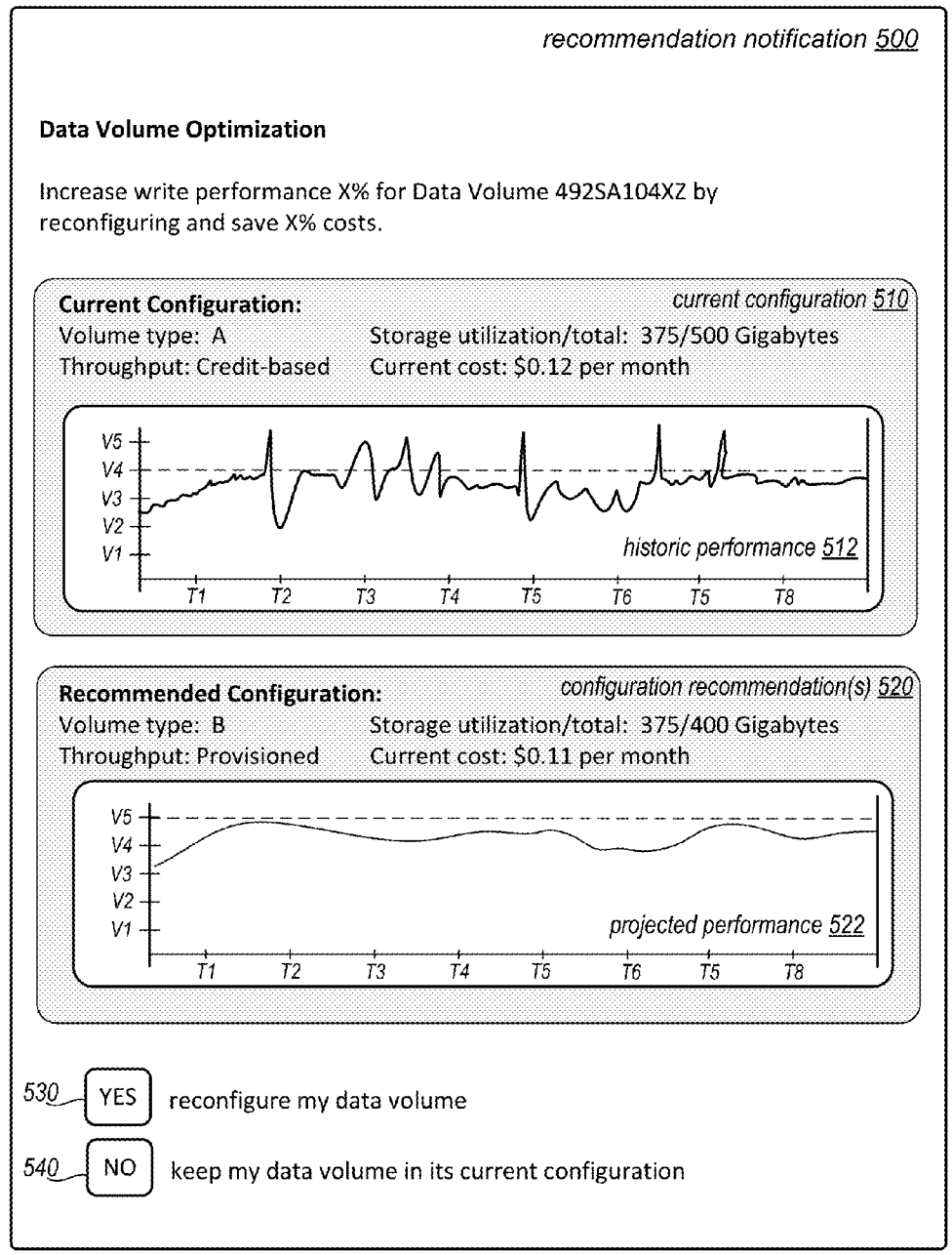
FIG. 5 is an example illustration of a notification of a configuration recommendation for a data volume, according to some embodiments.

FIG. 5 is an example illustration of a notification of a configuration recommendation for a data volume, according to some embodiments. Recommendation notification 500 may include textual and/or graphical elements to provide an indication recommended configuration(s) for a data volume. For instance, recommendation notification may identify a particular data volume by a data volume name or identifier. In at least some embodiments, a summary statement or section may indicate the prospective changes which may be achieved be selecting to perform a configuration recommendation. For instance, as illustrated in FIG. 5, it is stated that "Increase write performance X % for Data Volume 492SA104XZ by reconfiguring and save X % costs."

In some embodiments, current configuration element 510 may provide details describing a current configuration of the data volume. For instance, the current configuration 510 may display current data volume type (e.g., solid state storage backed or magnetic storage backed), storage size (e.g., total and/or currently utilized), how storage throughput is managed/allocated (e.g., credit-based, provisioned), and/or current costs. In at least some embodiments, one or more client utilization metrics or historic performance 512 may be provided (e.g., IOPs). For instance, the metrics driving or triggering the recommendation may be included for explanation purposes (or for contrasting with recommended configurations). As illustrated in FIG. 5, historic performance 512, illustrates a utilization metric that illustrates sharp declines when crossing the dotted line threshold (e.g., illustrating throttling of I/O when an IOPs credit balance is exceeded).

Configuration recommendation(s) 520 may be included in recommendation notification 500, describing various changes (e.g., changes to volume type, resource allocation, or other change, such as a change in location and/or cost) and/or data volume offerings that provide the recommended changes. In at least some embodiments, a projected performance 522 indication may be included to illustrate potential upsides or optimizations (e.g., to performance and/or cost). For instance, projected performance 522 is illustrated as not exceeding the dotted line (e.g., a provisioned IOPs threshold) which may indicate a more consistent performance (as opposed to the vacillations illustrated in historic performance 512). Please note that although one recommended configuration is illustrated in FIG. 5, multiple recommended configurations may be included in recommendation notification 500 (one of which may be selected) and thus FIG. 5 is not intended to be illustrating as to the number of recommend configurations that may be included.

In at least some embodiments, configuration recommendations may be displayed as different data volume offerings, listing multiple different data volume offerings which may be selected for display of further details. For instance, data volume offerings that provide different larger storage sizes, for instance, may be listed. Interaction, such as selection of one of the different data volume offerings may provide further information, such as performance characteristics and/or cost. In at least some embodiments, different pricing models may be implemented for the different data volume offerings. A marketplace model, for example, may allow data volume offerings with particular configurations to be listed by the provider network or third-party providers/facilitators/operators. Data volume offerings may be provided based on current demand (e.g., changing the cost of reconfiguring the data volume according to the volume offering) and/or may offer different utilization terms (e.g., different pricing scheme lengths, reserved or interruptible service, etc.).

As illustrated in FIG. 5, one or more graphical user interface elements 530 and 540 may be implemented to provide a response to the recommendation notification 500. For instance, in FIG. 5, "YES" element 530 may be selected to reconfigure the data volume according to configuration recommendation 520. In at least some embodiments, "YES" element 530 may provide a "one-click" user experience such that once selected the reconfiguration is automatically performed without further user interaction. Other such user interface elements may provide a similar one-click experience (such as a "YES" element next to each of a list of multiple configuration recommendations). "NO" interface element 540 may be selected, in some embodiments, to decline performing a reconfiguration.

Whether implemented as a graphical user interface, textual notification, or other form of communication many of the various portions of information discussed above with regard to FIG. 5 may be included in the notification. Similarly, the configuration selection 430 may be provided as a textual response (e.g., via a command line interface) in addition to or instead of the various user interface elements discussed above. Therefore the previous discussion is not intended to be limiting as to other forms recommendation notification(s) 420 or configuration selection 430.

In at least some embodiments, a configuration completion notification may be sent 440 via interface 229 upon completion of a reconfiguration of a data volume. In instances where the configuration was performed automatically, further details, such as discussed above with the configuration recommendation may be provided (e.g., change to volume type, resource allocation, location, etc.). In some embodiments, the notification 440 may be provided via graphical notification system or message board for a customer account, such as discussed above for recommendation notification(s) 420.

The examples of dynamic configuration of data volumes discussed above with regard to FIGS. 2-5 have been given in regard to a block-based storage service. Various other types or configurations of storage systems or services providing data volumes may implement these techniques. Different configurations of the various modules, components, systems, and or services described above may implement dynamic configuration of data volumes and may be configured to determine configuration recommendations, detect authorization to perform configuration recommendations, and configure data volumes. FIG. 6 is a high-level flowchart illustrating various methods and techniques for implementing dynamic configuration of data volumes, according to some embodiments. These techniques may be implemented using a control plane, configuration manager or other component for configuring data volumes in a storage system, as described above with regard to FIGS. 2-5.

As indicated at 610, a client utilization of a data volume hosted in a storage service for a client may be monitored. Client utilization data may be, in various embodiments, storage utilization indicating the total amount data stored in a data volume out of total storage allocated to the data volume, access utilization, such as IOPS (or some other indication of the workload performed to access a data volume), and/or any other performance characteristics, such as throughput (e.g., number of bytes transferred per second) or latency (e.g., the amount of time to perform an operation or transaction at the data volume) which may be indicative of or related to client utilization of a data volume.

As indicated at 620, a recommendation event may be detected. The recommendation event may be triggered based on the detection of a particular alarm, or scenario indicated by the monitored client utilization data (e.g., a data volume has exceeded a burst access credit balance for an Xth time), in some embodiments. In some embodiments, a recommendation event may simply be a timer or other event which instigates periodic recommendation generation for data volumes (e.g., once a week or month). In some embodiments, configuration recommendation(s) may be determined in response to the detected recommendation event.

As indicated at 630, configuration recommendation(s) to reconfigure the data volume according to data volume offerings of the service, based, at least in part, on the client utilization of the data volume may be determined, in some embodiments. Various recommendation techniques may be implemented to determine configuration recommendations for data volumes according to available data volume offerings that reconfigure the data volume such that subsequent access to a data volume after reconfiguration is provided via the new configuration. For instance, baseline or likely utilization or requirements for a data volume may be determined based on an analysis of the historical client utilization data. If, for example, utilized storage of a data volume varies between 450 and 650 Gigabytes, then a baseline requirement of 650 Gigabytes may be identified. Configuration recommendations may be determined which may optimize or improve a data volume with respect to performance and/or cost. FIG. 7, discussed below provides various examples of configuration analysis to optimize configuration goals. In some embodiments, configuration goals may be explicitly defined by a client (e.g., only provide configuration recommendations that increase performance AND lower cost). In other embodiments, configuration goals may be dynamically identified based on the performance and/or cost deficiencies described above and/or other triggers, alarms or scenarios in which volume configurations may need to be changed (e.g., detecting that a data volume is running out of available storage).

Different optimization techniques may be implemented to solve for the identified configuration goals based on possible configurations of a data volume (e.g., implementing various terminating, iterative, or heuristic-based techniques) to solve for configurations that improve a data volume with respect to one or more of the identified goals. Configuration recommendations may include changes to data volume type (e.g., general purpose, provisioned access, or cost-efficient as discussed above) and/or resource allocation or utilization of a data volume (e.g., storage, IOPS). For instance, a configuration recommendation may change data volume types to increase IOPS or may change storage size to increase IOPS. In some embodiments, configuration recommendations may be generated based upon a determination that a different locality (e.g., different resource host or infrastructure zone) may provide better performance for a data volume (e.g., configuring a data volume at a locality with lower network utilization in order to provide better network access to the data volume). Appropriate data volume offerings that provide the recommended configurations may be identified, in some embodiments. Multiple configuration recommendations may be generated for a data volume.

As indicated at 640, client authorization may be detected to perform a recommendation. Client authorization may be explicitly received and detected via an interface, in some embodiments. For example, a graphical user interface may be implemented, such as discussed above with regard to FIG. 5, which may provide a single user interface element that if selected, may indicate that the configuration recommendation should be performed. Other types of configuration or indication of selections of configuration recommendations may be received, such as API requests generated from a command line interface. In at least some embodiments, clients or users may pre-authorize client recommendations, either for specific optimization goals (e.g., cost and performance), or trigger events (e.g., insufficient storage capacity available). A user account setting, data store, or other set of information may be maintained that indicates those data volumes for which pre-authorization has been granted (and for what type of configuration recommendation).

As indicated at 650, the data volume may be reconfigured according to the configuration recommendation. For instance, migration operations may be performed to move a data volume to a different resource host with capability and/or capacity to host the data volume in the new recommended configuration. A migration operation may, in some embodiments, be performed by directing a current resource host to transfer the data volume to the destination resource host. In some embodiments, an intermediary, such as a migration worker task or node, may direct and/or receive the resource before sending the resource to the destination resource host. Multiple migration operations may be performed to move a data volume that has multiple replicas or copies (e.g., master and slave(s)) in some embodiments. Migration operations may be performed in such a way as not to disrupt or impact client utilization of the data volume. In at least some embodiments, configuring a data volume may include updating a resource host to provide the data volume at a new configuration, without migrating the data volume. Metadata, access or utilization policies, storage mapping, or other data that controls how data volumes are implemented at the host(s) may be updated to reflect the new configuration, in some embodiments.

The techniques described above with regard to FIG. 6 may be performed as part of a control plane or other storage service management system in order to evaluate groups of data volumes for performing recommended changes. For instance, data volumes for many different clients or user accounts may be periodically evaluated by the control plane to determine if a different configuration may lower the cost of the data volumes (e.g., without lowering performance). If so, the control plane may reconfigure the group of data volumes in order to achieve cost savings for the group of data volumes.

FIG. 7 is a high-level flowchart illustrating various methods and techniques for determining configuration recommendations, according to some embodiments. As indicated at 710, optimization goals for a data volume may be identified. Optimization goals may be explicitly defined or set by a user or client of a data volume, in some embodiments. For instance, a data volume may be authorized for automated configuration when cost improvements are identified for the data volume. Similarly, a data volume may be identified for considering performance improvements which a user may explicitly authorize or decline upon receiving notification of the recommendations. In at least some embodiments, multiple goals may be identified (e.g., cost, performance, and both cost and performance).

As indicated at 720, 730, and 740 cost optimization goals, performance optimization goals, and an optimization goal to improve performance and cost may be identified. Respective determinations of data volume offerings may be made to improve the data volume with respective to each of these goals, as indicated at 722, 732, and 742. Historical client utilization data of the data volume may be analyzed to evaluate how each of the different optimization goals may be reached. For instance, a cost optimization goal might recognize that changing volume types from a provisioned access volume to a general purpose volume may lower costs to store and access a particular amount of data with no (or negligible) effects on access capacity to the data volume, if historical client utilization data indicated that the IOPS performed at the data volume did not fully utilize the provisioned access capacity of the data volume and that burst capacity provided by a data volume offering that includes a general purpose data volume would be sufficient to provide a similar performance experience. In another example of a cost optimization goal, an evaluation of the data volume may determine that the data is accessed so infrequently that a change in volume type to a data volume offering that includes a cost-efficient data volume would provide lower costs for the data volume with no (or negligible) effects on performance of the data volume.

Similar analyses may be performed with respect to performance goals. For instance, the historical client utilization of data volume implemented in a cost-efficient data volume type may indicate that a change to a data volume offering that includes a general purpose or provisioned access volume type would provide better access to the data volume. Some data volume offerings, as noted above may involve a change to the resource allocation for a data volume (even if not a change to the volume type). For instance, in another performance optimization example, a recommended increase to the storage size of a general purpose volume may be determined in order to increase the refill rate at which burst access credits are added to the credit balance for the data volume, based on an analysis of client utilization history indicating that access to the data volume is being throttled for lack of access credits.

In some embodiments, performance and cost may be both optimized (which may provide different data volume offerings than optimizing for cost or performance individually), as indicated at 742. For instance, historical client utilization data may indicate that access provided to a data volume is insufficient (e.g., not enough IOPS). The storage size of the data volume may be large in order to provide a faster refill rate for burst access credits, but only a portion of the storage size is actually utilized. A data volume offering may be identified to configure the data volume with a smaller (and cheaper) storage size as a provisioned access volume with a number of IOPS provisioned to meet the IOPS requirements indicated by the historical client utilization data.

In a least some embodiments, data volume offering(s) (s) may be provided as configuration recommendation(s) that exceed an improvement threshold. An improvement threshold may be determined by a client and/or the storage system to exclude recommendations that do not meet some threshold of benefit to be worth cost of performing the configuration. For instance, a storage system may implement the threshold to ensure that negligibly beneficial recommendations are not provided and/or automatically performed, wasting system resources to perform the configurations. Similarly, clients may elect to receive recommendations only when the benefit is of certain significance (e.g., saves a certain amount of costs).

As indicated at 760, notification of the configuration recommendation(s) 760 may be provided. As discussed above with regard to FIGS. 4 and 5, notifications may be may be provided via an API formatted response sent directly to a client. In some embodiments, alternative communication protocols or technologies may be utilized to provide recommendation notifications, such as electronic mail (e-mail), audible messages (e.g., to a mobile phone), or SMS or MMS text messages. In at least some embodiments, a graphical user interface notification may be provided. A notification may be posted or displayed at a site dashboard, message-board, or other communication interface provided via a graphical user interface.

Figure 8:
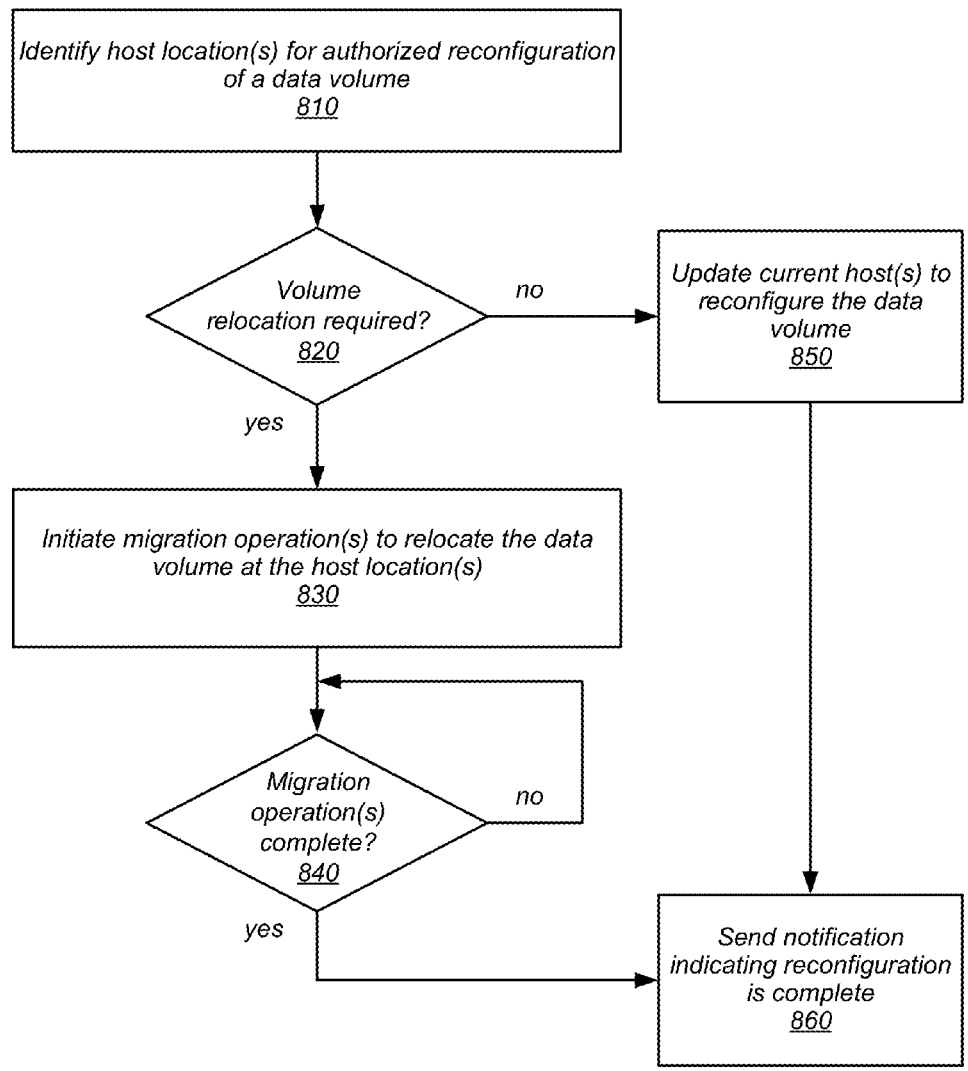
FIG. 8 is a high-level flowchart illustrating various methods and techniques for configuring data volumes, according to some embodiments.

FIG. 8 is a high-level flowchart illustrating various methods and techniques for configuring data volumes, according to some embodiments. An authorized configuration recommendation for a data volume may be determined according to the various techniques discussed above. Configuring the data volume may include identifying resource hosts with the capability and capacity to host the data volume as reconfigured. As indicated at 810, host locations for authorized reconfiguration of a data volume may be identified, in some embodiments. For instance, host utilization data and/or configuration data may be evaluated to identify those resource hosts with the storage capacity or access capacity (e.g., IOPs) to host the reconfigured data volume. Similarly, host locations with the hardware (e.g., SSDs or HDDs) and/or software to provide the reconfigured data volume may be identified.

In at least some embodiments, a first determination may be a check as to whether the resource host that currently hosts the data volume may continue to host the data volume after configuration, as indicated at 820. For instance, if the host implements SSD backed storage, and the configuration recommendation includes a change between volume types that both utilize SSD backed storage, then the host may be able to host the data volume after reconfiguring. As indicated at 850, in such scenarios, the current host(s) may be updated to reconfigure the data volume, in some embodiments. For example, metadata, access or utilization policies, storage mapping, or other data that controls how data volumes are implemented at the host(s) may be updated to reflect the new configuration (e.g., increasing/decreasing storage size, increasing/decreasing IOPs, etc.).

If, as indicated by the positive exit from 820, the data volume is to be moved, then migration operation(s) may be initiated to relocate the data volume at the identified host locations, as indicated at 830. In various embodiments, as discussed above with regard to element 850, the identified host locations may be configured to implement the data volume at the new configuration (e.g., updating metadata, access or utilization policies, storage mapping, or other data that controls how data volumes are implemented). A migration operation may, in some embodiments, be performed by directing a current resource host to transfer the data volume to the destination resource host. In some embodiments, an intermediary, such as a migration worker task or node, may direct and/or receive the resource before sending the resource to the destination resource host. Multiple migration operations may be performed to move a data volume that has multiple replicas or copies (e.g., master and slave(s)) in some embodiments. Migration operations may be performed in such a way as not to disrupt or impact client utilization of the data volume. For instance, while migration operations are not complete, access to the data volume may still be provided according to the current configuration of the data volume. Upon completion of the migration operations, a notification indicating that reconfiguration is complete may be sent, as indicated at 860, in various embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of dynamic configuration of data volumes as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A block-based storage service of a provider network, comprising:
    one or more computing devices implementing a configuration manager for the block-based storage service, the configuration manager configured to:
        determine one or more configuration changes for a data volume hosted for a client in the block-based storage service according to one or more data volume offerings of the block-based storage service based, at least in part, on historical client utilization of the data volume; and reconfigure the data volume to a new configuration according to the determined one or more configuration changes such that subsequent utilization of the data volume is provided according to the new configuration, wherein reconfiguration of the data volume comprises:
update of one or more hosts of the data volume to provide the new configuration, or
performance of one or more migration operations to relocate the data volume to one or more different hosts capable of providing the new configuration, or
migration of the data volume to another storage service implemented as part of the provider network.

2. The service of claim 1, wherein, to determine the one or more configuration changes, the configuration manager is configured to:
identify one or more optimization goals for the data volume, wherein the optimization goals comprise at least one of:
a performance optimization goal; or
a cost optimization goal; and
determine one or more data volume offerings that improve the data volume with respect to the optimization goals.

3. The service of claim 1, wherein the configuration manager is further configured to:
provide the determined one or more configuration changes to the client; and
receive from the client a selection of the new configuration based on the one or more configuration changes provided to the client.

4. The service of claim 3, wherein the determined one or more configuration changes are provided to the client via a graphical user interface as one or more configuration recommendations; and
the configuration manager is configured to receive an indication of a selected configuration recommendation from the client via the graphical user interface.

5. The service of claim 1, wherein to reconfigure the data volume to a new configuration the configuration manager is configured to change the data volume to a different data volume type.

6. The service of claim 1, wherein to reconfigure the data volume to a new configuration the configuration manager is configured to change one or more resource allocations for the data volume.

7. A method, comprising:
performing, by one or more computing devices:
determining one or more configuration changes for a data volume hosted for a client in a block-based storage service according to one or more data volume offerings of the block-based storage service based, at least in part, on historical client utilization of the data volume; and
reconfiguring the data volume to a new configuration according to the determined one or more configuration changes such that subsequent utilization of the data volume is provided according to the new configuration, wherein reconfiguring the data volume comprises:
updating one or more hosts of the data volume to provide the new configuration, or
performing one or more migration operations to relocate the data volume to one or more different hosts capable of providing the new configuration, or
migrating the data volume to another storage service.

8. The method of claim 7, further comprising:
providing the determined one or more configuration changes to the client; and
receiving from the client a selection of the new configuration based on the one or more configuration changes provided to the client.

9. The method of claim 8,
wherein the one or more configuration changes are provided via a graphical user interface to the client, and wherein the selection received is of a selection of a user interface element of the graphical user interface; and
wherein reconfiguring the data volume according to the selected new configuration is performed in response to the selection of the user interface element of the graphical user interface.

10. The method of claim 7, further comprising:
detecting a recommendation event for the data volume; and
wherein determining the one or more configuration changes is performed in response to detecting the recommendation event.

11. The method of claim 7, wherein determining the one or more one or more configuration changes comprises:
identifying one or more optimization goals for the data volume, wherein at least one of the optimization goals is a performance optimization goal; and
determining one or more data volume offerings that improve the data volume with respect to the optimization goals.

12. The method of claim 7, wherein the reconfiguring changes the data volume to a different data volume type.

13. The method of claim 7, wherein the reconfiguring further comprises changing one or more resource allocations for the data volume.

14. A non-transitory, computer-readable storage medium, storing program instructions that when executed by one or more computing devices cause the one or more computing devices to implement:
determining one or more configuration changes for a data volume hosted for a client in a block-based storage service according to one or more data volume offerings of the block-based storage service based, at least in part, on historical client utilization of the data volume; and
reconfiguring the data volume to a new configuration according to the determined one or more configuration changes such that subsequent utilization of the data volume is provided according to the new configuration, wherein reconfiguring the data volume comprises:
updating one or more hosts of the data volume to provide the new configuration, or
performing one or more migration operations to relocate the data volume to one or more different hosts capable of providing the new configuration, or
migrating the data volume to another storage service.

15. The non-transitory, computer-readable storage medium of claim 14, wherein the program instructions cause the one or more computing devices to further implement:
providing the determined one or more configuration changes to the client; and
receiving from the client a selection of the new configuration based on the one or more configuration changes provided to the client.

16. The non-transitory, computer-readable storage medium of claim 15, wherein the one or more configuration changes are provided via a graphical user interface to the client, and wherein the selection received is of a selection of a user interface element of the graphical user interface; and wherein reconfiguring the data volume according to the selected new configuration is performed in response to the selection of the user interface element of the graphical user interface.

17. The non-transitory, computer-readable storage medium of claim 14, wherein determining the one or more one or more configuration changes to the data volume comprises:

identifying one or more optimization goals for the data volume, wherein at least one of the optimization goals is a performance optimization goal; and determining the one or more data volume offerings that improve the data volume with respect to the optimization goals.

18. The non-transitory, computer-readable storage medium of claim 14, wherein the reconfiguring changes the data volume to a different data volume type.

19. The non-transitory, computer-readable storage medium of claim 14, wherein the reconfiguring further comprises changing one or more resource allocations for the data volume.

20. The non-transitory, computer-readable storage medium of claim 14, wherein the program instructions cause the one or more computing devices to further implement:

upon completion of the reconfiguration of the data volume, providing a notification to the client indicating that reconfiguration of the data volume is complete.

* * * * *